US011945241B2

(12) United States Patent
Dahlmann et al.

(10) Patent No.: US 11,945,241 B2
(45) Date of Patent: Apr. 2, 2024

(54) PRINTER FOR PRINTING MARKER CARDS WITH MARKERS FOR MARKING ELECTRICAL APPLIANCES

(71) Applicant: Weidmüller Interface GmbH & Co. KG, Detmold (DE)

(72) Inventors: Markus Dahlmann, Rheda-Wiedenbrück (DE); Thorsten Bornefeld, Schlangen (DE); René Manke, Bielefeld (DE); Rico Schindler, Porta Westfalica (DE); Thomas Köster, Schlangen (DE)

(73) Assignee: Weidmüller Interface GmbH & Co. KG (DE)

( * ) Notice: Subject to any disclaimer, the term of this patent is extended or adjusted under 35 U.S.C. 154(b) by 252 days.

(21) Appl. No.: 17/427,360

(22) PCT Filed: Feb. 26, 2020

(86) PCT No.: PCT/EP2020/055057
§ 371 (c)(1),
(2) Date: Jul. 30, 2021

(87) PCT Pub. No.: WO2020/174017
PCT Pub. Date: Sep. 3, 2020

(65) Prior Publication Data

US 2022/0143989 A1 May 12, 2022

(30) Foreign Application Priority Data

Feb. 27, 2019 (DE) ..................... 10 2019 104 934.2

(51) Int. Cl.
*B41J 3/407* (2006.01)
*B41J 13/08* (2006.01)
*B41J 13/12* (2006.01)

(52) U.S. Cl.
CPC ............... *B41J 3/407* (2013.01); *B41J 13/08* (2013.01); *B41J 13/12* (2013.01)

(58) Field of Classification Search
CPC ............. B41J 3/407; B41J 13/08; B41J 13/12
See application file for complete search history.

(56) References Cited

U.S. PATENT DOCUMENTS 5,814,796 A * 9/1998 Benson .................. G06K 17/00 235/375
5,959,278 A 9/1999 Kobayashi et al.
(Continued)

FOREIGN PATENT DOCUMENTS

CN 107284040 A * 10/2017 ............. B41J 2/435
DE 102006003056 A1 7/2007
(Continued)

OTHER PUBLICATIONS

Fan, MachineTranslationofCN-107284040-A,2017 (Year: 2017).*

*Primary Examiner* — Scott A Richmond
(74) *Attorney, Agent, or Firm* — LAUBSCHER & FRETWELL, P.C.

(57) ABSTRACT

A printer for printing plate-like media made of plastic and/or metal such as printing marker cards with markers for marking electrical appliances has various functional devices and an apparatus for handling the printable plate-like media. The marker cards are conveyed in the printer between the functional devices. The handling apparatus has several stations which are formed as receiving and fixing devices for a marker card to be printed. One or more of the stations is configured so as to be pivotable, such that it can be pivoted out of a first pivot position into a second pivot position against a resilient stop.

36 Claims, 13 Drawing Sheets

(56) References Cited

U.S. PATENT DOCUMENTS

| | | | | |
|---|---|---|---|---|
| 9,902,181 | B2 | 2/2018 | Bier et al. | |
| 2008/0031674 | A1* | 2/2008 | Piana | B41J 13/12 400/622 |
| 2013/0314488 | A1 | 11/2013 | Bier et al. | |

FOREIGN PATENT DOCUMENTS

| | | | |
|---|---|---|---|
| DE | 102014203821 | A1 | 9/2014 |
| DE | 102013018196 | A1 | 4/2015 |
| DE | 102014012055 | A1 | 2/2016 |
| EP | 1884367 | A2 | 2/2008 |
| EP | 3335889 | A1 | 6/2018 |
| JP | 2011116466 | A | 6/2011 |
| WO | 2006044363 | A2 | 4/2006 |
| WO | 2015144749 | A2 | 10/2015 |

* cited by examiner

PRINTER FOR PRINTING MARKER CARDS WITH MARKERS FOR MARKING ELECTRICAL APPLIANCES

This application is a national application based on PCT/EP2020/05507 filed Feb. 26, 2020. PCT/EP2020/05507 claims priority of DE 10 2019 104 934.2 filed Feb. 27, 2019. The entire content of these applications is incorporated herein by reference.

BACKGROUND OF THE INVENTION

The present invention relates to a printer for printing plate-like media, in particular for printing marker cards with markers for marking electrical appliances. The printer includes an apparatus for handling the printable plate-like media, in particular the marker cards with markers for marking electrical appliances, in the printing process.

BRIEF DESCRIPTION OF THE PRIOR ART

A printer and a plate-like printed medium, in particular a card or marker for marking electrical appliances, connectors, cables or the like, are known from DE 20 2006 005 458 U1, wherein at least one or a multiplicity of markers is/are combined to form a mat. The printed medium, in particular the markers, are provided with imprints when passed through a printer. In this case, the printed medium, in particular the mat, is provided with a first device for protection against twisting and which is configured for the purpose of interacting with a corresponding device for protection against twisting on the printer in such a way that printing of the printed medium—in particular the mat—is possible only when the printed medium is inserted in a correct orientation.

Furthermore, the construction of a corresponding printer is described, which is constructed in a straight line in accordance with the technical teaching of DE 20 2006 005 458 U1—i.e. without a change of direction for the printed medium to be printed—and is provided with protection against twisting, a stationary printing mechanism, a stationary fixing device and an advancing or conveying for the printed medium, or for the mat.

A printer with a separation apparatus is known from DE 20 2012 101 998 U1. The separation apparatus works according to a pusher-locking rod principle. The movement of the pushers and the locking rods, respectively, takes place synchronously via electrically actuated lifting bar kinematics that work for one side in each case.

A printer of the generic type, but also of the type according to the invention, can have the cartridge, in particular the shaft cartridge with the separation device, a printing mechanism, a thermal fixing unit and an output station. According to the technical teaching of DE 20 2012 101 998 U1, the individual components of the printer are arranged in a line.

DE 10 2013 104 780 A1 presents a cartridge apparatus and a method for stacking printed marking element mats. According to DE 10 2013 104 780, the cartridge apparatus is arranged on the output side of a printer in a line in relation to the printer.

The printing devices according to the prior art have proven to perform well in practice, but an installation-space-saving arrangement of the individual stations of the printer and a higher printing performance of the entire printing process are desirable. In this case, the intention is for a change of direction during transportation of the devices to be printed to take place in a particularly advantageous manner.

The goal of the present invention is therefore to create such a printer that achieves this goal.

SUMMARY OF THE INVENTION

Accordingly, it is an object of the invention to provide a printer for printing plate-like media made of plastic and/or metal, in particular for printing marker cards made of plastic and/or metal with markers for marking electrical appliances. The printer has various functional devices and an apparatus for handling the printable plate-like media, in particular the marker cards with markers for marking electrical appliances, in the printing process. The plate-like media are conveyed in the printer between functional devices. The conveyor has several stations which are formed in each case as receiving and fixing apparatuses for the plate-like medium to be printed, in particular a marker card, wherein one or more of the stations are configured so as to be pivotable, such that it or they can be pivoted out of a first pivot position into a second pivot position against a resilient stop.

It is advantageous that the conveyor has several stations, which in each case are formed as receiving devices for one or more plate-like media, in particular a marker card in each case. Alternatively, several marker cards can also be fixed simultaneously. One or more of the stations are configured to be pivotable, such that they are pivotable out of a first pivot position into a second pivot position.

In this manner, a printer with a relatively high throughput need not be constructed solely in a single straight direction and thus be excessively “long”, but rather overall advantageously can be kept relatively “short” in one direction, for example.

It is likewise advantageous that one or more of the stations are pivotable against a resilient stop. The resilient stop ensures that there is a soft tolerance window and a soft motor stop. In this case, the corresponding stations nevertheless advantageously come to a precise standstill at the stop or stops.

One or more of the stations is pivotable against a resilient stop and at least two of the stations are pivotable in such a way that they are aligned with one another in a first pivot position and are not aligned with one another in another pivot position. Overall, this provides improved operation.

In a further embodiment, the stations can each be designed as a type of shell with a U-shaped cross-section. As a result, the plate-like medium such as the marker card, can be fixed simply in a substantially form-fitting manner.

According to a further embodiment, each station can have a conveying device for further conveying the respective plate-like medium inside the station and from this station to the neighboring station. As a result, the construction outlay for the handling device can be kept low.

The conveying device is a conveyor belt or a belt conveyor. Alternatively, other conveying devices are also possible, such as a roller conveyor for example. As a result, a simple and therefore advantageous conveying device is provided.

According to a preferred configuration, conveying of a respective plate-like medium does not take place in a straight line but rather with at least one change of direction or several changes of direction of the respective plate-like medium during handling, such that the conveying path overall deviates from a straight line.

In this manner, a printer with a relatively high throughput is constructed not so much in a single straight direction and thus excessively “long”, but rather the printer can be kept relatively “short” in one direction, although overall a relatively long conveying path can be produced, on which the plate-like media are printed, fixed and allowed to cool.

According to a first embodiment, the handling or conveying apparatus and method are configured in such a way that a single change of direction of the respective plate-like medium is produced and overall, an angular or L-shaped conveying path of the respective plate-like medium is produced.

In contrast, according to another embodiment, the handling apparatus and method are configured in such a way that they produce two changes of direction of the respective plate-like medium and overall a U-shaped conveying path of the respective plate-like medium is produced. In this way, it is possible that a card enters a printer on the side which is also the same side out of which it is conveyed and output from the printer.

Furthermore, the handling apparatus and method are configured in such a way that more than two changes of direction of the respective plate-like medium are produced.

According to another embodiment, the conveying path of the respective plate-like medium lies in a single plane without a vertical offset or with an optional vertical offset less than 20 mm. Preferably, the medium to be printed is also not turned over, as is often customary in a conventional paper printer. This further simplifies the construction outlay for the handling apparatus.

Furthermore, the printer has one or more of the following functional devices: a separation device, a printing device, and/or a fixing device and conveying takes place from functional device to functional device.

Therefore, according to one embodiment at least a first, a second and a third station are provided. The apparatus has a pivot plate which is positioned between two of the stations, with one of these stations being referred to as the second station and the other station being referred to as the third station. In this case, the second station and the third station are pivotable out of a parallel position into a mutually aligned position. The pivot plate has a stop section, which extends at an angle between the stations which are oriented in parallel in a first position. Preferably, the pivot plate has the resilient stops.

According to an alternate embodiment, the stop section has a web, which is provided with a borehole, which is engaged by a grommet of a first spring.

In addition, the pivot plate has one or more bearing sections. In this case, the bearing section can accommodate a stationary bearing pin of a second pivot bearing of the third station and can have a retention plate coaxially in relation to the second pivot bearing, with the retention plate being mounted in a rotatable manner coaxially in relation to the second pivot bearing. Thereafter, the retention plate is attached to a first drive which is designed as a motor and which is preferably provided for the purpose of initiating a pivot movement of the third station via a gear mechanism such as a gearwheel mechanism. The retention plate has a second spring, which serves as a restoring spring for the motor. The motor drives a pinion, and the pinion meshes with a gearwheel, with the gearwheel being connected to the station in a non-rotatable manner. Thereafter, the printer has a guide strip on which a guide carriage is guided in a movable manner, with the guide carriage having a stationary bearing pin of a first pivot bearing by which the second station is mounted in a pivotable manner on the guide carriage.

According to a further embodiment, the second station has a web which has a borehole that is engaged by a grommet of a third spring. The third spring is connected to the guide carriage. Vertical movement of the station along the guide strip and pivotal counter-clockwise movement of the station about the central axis of the first pivot bearing are actuated by a single second drive. The second station by way of the third spring and the pivot plate by way of the first spring each have a resilient end stop, with the result that, after a pivot movement of the second station has been carried out, from then onwards both the second station and the pivot plate are aligned parallel to one another, even when the second station is displaced still further vertically upwards along the guide strip.

The third station driven by the motor performs a pivot movement via the pinion and the gearwheel with a counter-torque in relation to the torque of the motor being applied by the second spring resulting in a clockwise pivot movement about a central axis of the second pivot bearing until the third station contacts the third stop. The second station and the third station are aligned with one another in a repeatable manner after the respective stops have been reached.

According to a particularly advantageous option which improves the operation of the apparatus, the drives continue after the stops of the stations have been reached with the first drive and the second drive continuing further into the corresponding springs and stopping as a result, although the stations are already contacting the stops.

In addition, the motor remains switched on for a certain additional period of time after the pivot movement of the third station has come to a standstill at the third stop pin and in the process the second spring is deflected, such that the third station contacts the third stop in a spring-loaded manner. Overall, the pivot-and-stop system of the spring-loaded second station and third station, during the respective pivot movement and during the contacting of the stops in the respective pivoted-out position of the respective station, acts in a way that compensates tolerance with respect to mechanical and control-related influences.

The printer has one or more of a separation device, a printing device, and/or a fixing device wherein conveying takes place from functional device to functional device. As a result, the handling of the plate-like medium to be printed can take place in an automated manner.

Optionally, the printer has at least one cooling area for cooling the plate-shaped medium. As a result, a fully installable plate-shaped medium can be removed from the printer in each case.

The invention also provides a method for handling, and particularly for conveying, a plate-shaped medium on a conveying path through a printer in which the conveying of a respective plate-like medium does not take place in a straight line but rather with at least one change of direction or several changes of direction of the respective plate-like medium during conveying. The conveying path deviates from a straight line wherein one or more of the stations are configured in a pivotable manner and, during operation, are pivoted out of a first pivot position into a second pivot position against a resilient stop.

In this case, a single change of direction of the respective plate-like medium is produced using the conveying apparatus and overall an angular or L-shaped—conveying path of the respective plate-like medium is produced. However, the handling apparatus can also be configured in such a way that two changes of direction of the respective plate-like medium are produced using the handling apparatus and overall a U-shaped conveying path of the respective plate-like medium is produced. Finally, more than two changes of direction of the respective plate-like medium may be produced using the handling apparatus and/or conveying on the conveying path of the respective plate-like medium takes place in a single plane without a vertical offset.

BRIEF DESCRIPTION OF THE FIGURES

The invention is described in greater detail below with reference to the accompanying drawing, in which:

FIG. 9 is a plan view of the apparatus from FIG. 1, wherein the marker card is brought out of the printing region into a transfer station;

DETAILED DESCRIPTION

The term "handle" or "handling" is to be understood, within the meaning of the present invention, as a change in the spatial position and orientation of a body with a specific geometric shape, for example by rotating or turning or retaining with a technical device, but without changing anything on the body itself such as in the case of processing. "Handling" further includes movement operations of the body, such as saving, separating, dividing, combining, or moving or conveying of the body, and also securing and inspecting of the body, which are performed by technical devices.

The term "conveying device" or "conveying" is to be understood, within the meaning of the present invention, as apparatus or devices for the forward movement of goods in delimited operational areas, or the forward movement of goods in delimited operational areas.

As regards the detailed construction of a marker card 2 with markers 3 for marking electrical appliances, connectors, cables or the like, at this point reference is made to DE 20 2006 005 458 U1.

Figure 1:
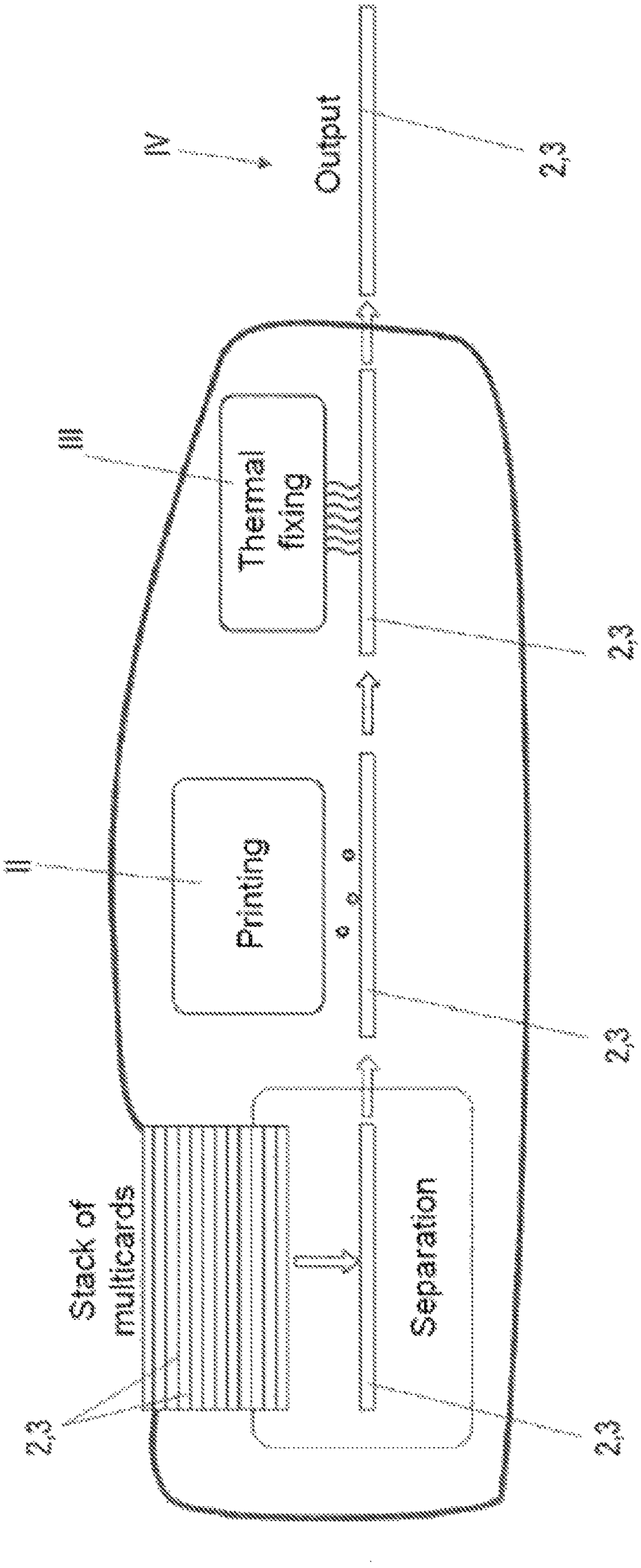
Fig. 1 PRIOR ART
FIG. 1 is a schematic view of a printer for printing marker cards with markers for marking electrical appliances, connectors, cables or the like according to the prior art.

A printer for printing marker cards 2 with markers 3 for marking electrical appliances, connectors, cables or the like according to the prior art is depicted in FIG. 1. In the printer according to the prior art, the handling of the marker card 2 takes place in one line, that is to say without a change of direction of the marker card during handling. The printer has various devices I, II, III, IV, each device being assigned a defined function.

The first device I is a separation device with a cartridge. In the second device II—a printing device—in each case a previously separated marker card 2 is printed. In the third device III—a fixing device, the print image is fixed on the printed marker card 2. In the fourth device IV—an output device—the fully printed marker card 2 is output. Where appropriate, a cooling area (not shown) is integrated into the output device.

Figure 2:
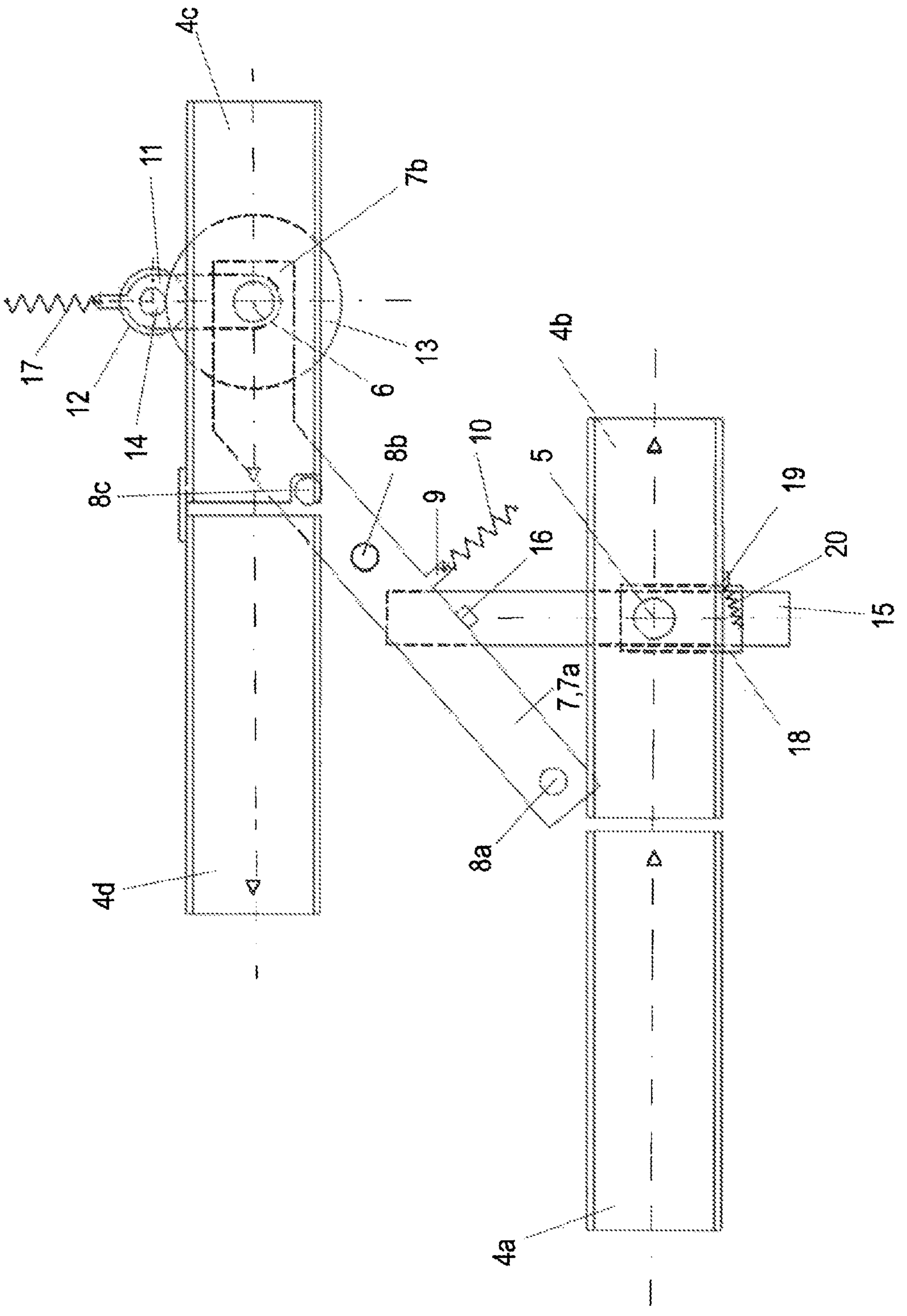
FIG. 2 is a plan view of an apparatus for handling printable marker cards with markers for marking electrical appliances, connectors, cables or the like in a printing process.

An example of an apparatus according to the invention for handling printable marker cards 2 with markers 3 for marking electrical appliances, connectors, cables or the like in a printing process of a printer is depicted in FIG. 2.

In this case, the handling, in particular conveying or the transportation, of the marker card 2 does not take place in a straight line but rather with a change of direction or several changes of direction of the marker cards during handling. Overall therefore, this results in a non-straight conveying path when conveying the respective plate-like medium through the printer.

The apparatus has several, in this example four, receiving and fixing apparatuses, which are referred to hereinafter as stations 4*a*, 4*b*, 4*c*, 4*d*, for one or more marker cards 2 to be printed, which lie behind one another. The stations 4*a* to 4*d* have a conveying device 23 depicted in FIG. 13, with which the respective marker card 2 can be conveyed in a translational manner from a station 4*a* to 4*c* to another station 4*b* to 4*d*.

The conveying device 23 is designed as a round belt conveyor with two round belts 24 which are guided in parallel and driven synchronously. Alternatively, other conveying devices 23 are also possible, such as a conveyor belt or a roller conveyor, for example.

Figure 13:
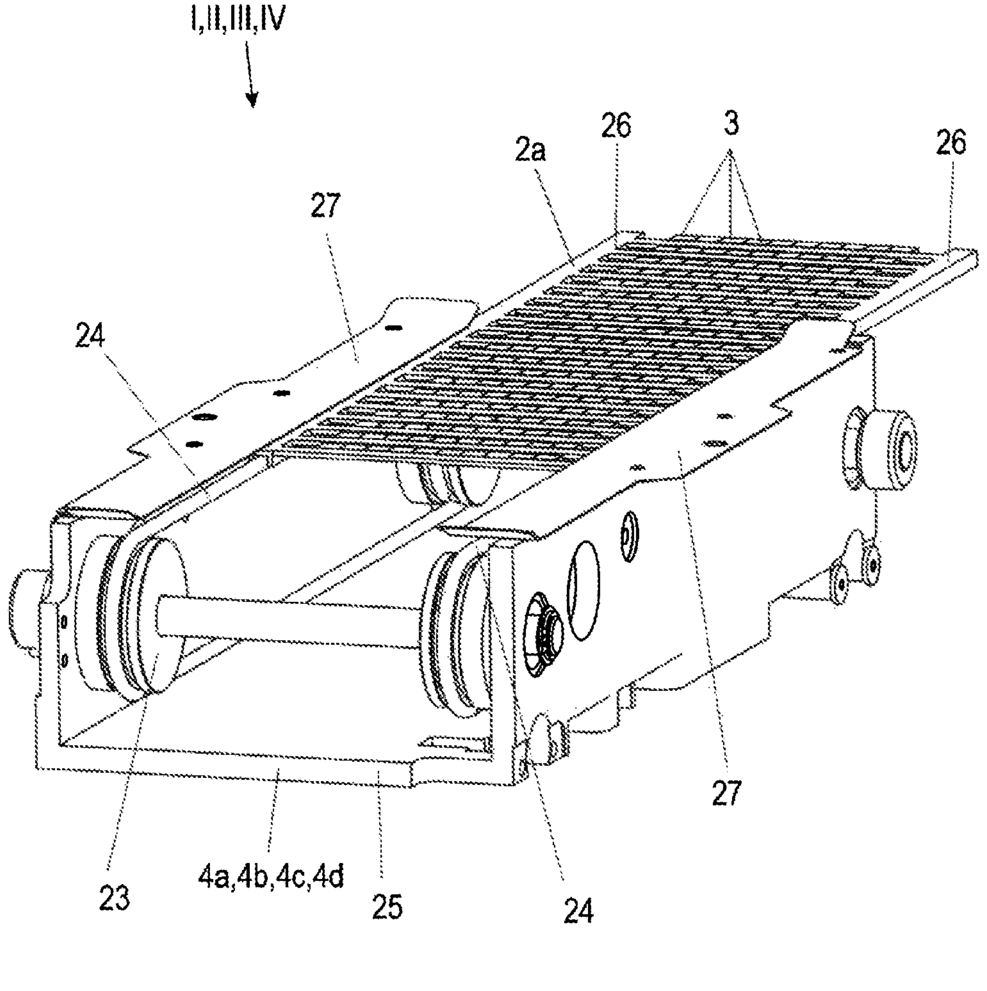
FIG. 13 is a spatial view of a station with a conveying means and a marker card.

The stations 4*a* to 4*d* can be designed as a type of shell 25 with a U-shaped cross-section (see also FIG. 13). One functional device I, II, III, IV can be assigned to each of these, i.e. a printing device or a fixing device.

In the example in FIG. 13, the marker card 2*a* has laterally arranged, integrally formed U profiles 26 which are at a tangent to the respective round belts 24 of the conveying device 23 on three sides and are supported on the respective round belt 24.

The stations 4*a* to 4*d* have sliding plates 27. The sliding plates 27 serve to guide the marker cards 2 in a vertical direction, "vertical" being in relation to the drawing plane in FIG. 13. In this way, secure guiding of the marker card 2 in one plane is achieved during conveying.

The first station 4*a* can be presented in a stationary manner and can be formed as a cartridge with a separation device as a functional device. It can therefore also form part of the separation device.

The second station 4*b* can be provided as a clamping and advancing device for the printing device and can thus form part of a printing device as a functional device. This can also form a type of deflector.

The second station 4*b* is pivotably borne by a first pivot bearing 5. The first station 4*a* and the second station 4*b* are arranged in a line behind one another, the second station 4*b* leaving this line by being displaced parallel in the subsequent printing process, in order to orientate the marker card 2*a* appropriately relative to a printing head. After the printing has been completed, a pivot movement can also be provoked via the same drive.

The third station 4*c* can also be provided as a deflector and is therefore, analogous to the second station 4*b*, pivotably borne by a second pivot bearing 6. The fourth station 4*d* is stationary. It can form part of a fixing device as a functional device, in which the printed print image is fixed onto the markers 3 by applying heat, for example.

The third station 4*c* and the fourth station 4*d* are arranged in a straight line behind one another, the third station 4*c* being pivotable, via the second pivot bearing 6, out of this line at an oblique angle thereto out of a first pivot position into a second pivot position oblique thereto.

The second station 4*b* and the third station 4*c* can be brought to lie in a line as required, via the respective first pivot bearing 5 and the second pivot bearing 6 and a drive.

With the apparatus, a U-shaped conveying direction is produced for the marker card 2 to be printed or for the printed marker card 2 in the printing process—therefore, by way of example, providing a conveying direction with two changes of direction. This results in an advantageous, installation-space-saving arrangement of the individual stations 4*a*, 4*b*, 4*c*, 4*d* in the printing process of the marker card 2.

The apparatus can also be configured in such a way that a single change of direction is produced such as an angular or L-shaped conveying direction. However, alternatively it is also conceivable that the conveying device 23 is configured in such a way that a conveying direction with more than two changes of direction—e.g. an S-shaped conveying direction is produced.

The conveying direction with at least one change of direction results in a higher printing performance of the overall printing process of the printer.

The apparatus can have a pivot plate 7 that is positioned between the second station 4*b* and the third station 4*c*. The pivot plate 7 has an elongated stop section 7*a* which extends diagonally in relation to the drawing plane in FIG. 2 at an angle between the second station 4*b* and the third station 4*c*. The stop section 7*a* can have several stops 8*a*, 8*b*, 8*c*, which protrude out of the pivot plate 7 perpendicular to the drawing plane in FIG. 2. The stops 8*a*, 8*b*, 8*c* can be firmly connected to the stop section 7*a* of the pivot plate 7 and can also engage through the stop section 7*a*.

The stop section 7*a* has a web 9 which is provided with a borehole which is engaged by a grommet of a first spring 10. A grommet at another end of the first spring 10 is suspended in a solid part that is not depicted in more detail here. The first spring 10 is designed as a helical tension spring. The stop section 7*a* has a further stop 16 which is positioned laterally on the stop section 7*a*.

The pivot plate 7 can also have a bearing section 7*b*. The bearing section 7*b* receives a stationary bearing pin of the second pivot bearing 6 of the third station 4*c*. The bearing section 7*b* has a retention plate 11 coaxial with the second pivot bearing 6.

A first drive such as a motor 12 is fitted on the retention plate 11 in a non-rotatable manner. The motor 12 initiates a pivot movement of the third station 4*c* via a gearwheel mechanism. The retention plate 11 has a second spring 17 which serves as a restoring spring for the motor 12. The second spring 17 is designed as a spiral tension spring. Alternatively, the spring can also be designed differently, as a spiral compression spring for example, to perform a resilient restoring function. The retention plate 11 is mounted in a rotatable manner coaxial with the second pivot bearing 6.

For this purpose, a gearwheel 13 is connected in a non-rotatable manner to the station 4*c* which meshes with a pinion 14 that can be driven by the motor 12, and thus the gearwheel mechanism is formed. The design of the gear mechanism as a gearwheel mechanism is advantageous, but not required. The gear mechanism can also be designed differently, for example as a flexible drive mechanism or a coupling mechanism. A direct drive of the pivot movement of the station 4*c* by the motor 12 is also possible. The motor 12 can also be formed as a gear mechanism motor.

Furthermore, a guide strip 15 serves as a straight guide for the translational displacement of the second station 4*b* vertically upwards, with "vertically upwards" being in relation to the drawing plane in FIG. 2. For this purpose, the guide strip 15 has a guide carriage 18. The guide carriage 18 is guided in a movable manner on the guide strip 15 and has a stationary bearing pin of the first pivot bearing 5 by which the second station 4*b* is mounted in a pivotable manner on the guide carriage 18. The second station 4*b* has a web 19. The web 19 has a borehole that is engaged by a grommet of a third spring 20. The third spring 20 is designed as a spiral tension spring. A grommet at another end of the third spring 20 is connected to the guide carriage 18. The third spring 20 serves as a restoring spring of the second station 4*b* when this is pivoted out about the first pivot bearing 5. This is one possible design for a restoring mechanism with a stop. Other structural designs or other geometric arrangements are also possible.

The third station 4*c* has a stop 21 which is supported on the outer side of the fourth station 4*d* and is positioned in such a way that a counter-clockwise pivot of the third station 4*c* is prevented. This is one possible design for the stop. Other structural designs or other geometric arrangements are also possible.

Furthermore, the third station 4*c* has a recess 22 by which the third station 4*c* can adopt a position in a line with the fourth station 4*d* despite the stop 8*c* which is positioned on the stop section 7*a* of the pivot plate 7 in the region of a free end of the third station 4*c* which is situated in a line with the fourth station 4*d* in such a way that it would prevent this without the recess 22.

Figure 3:
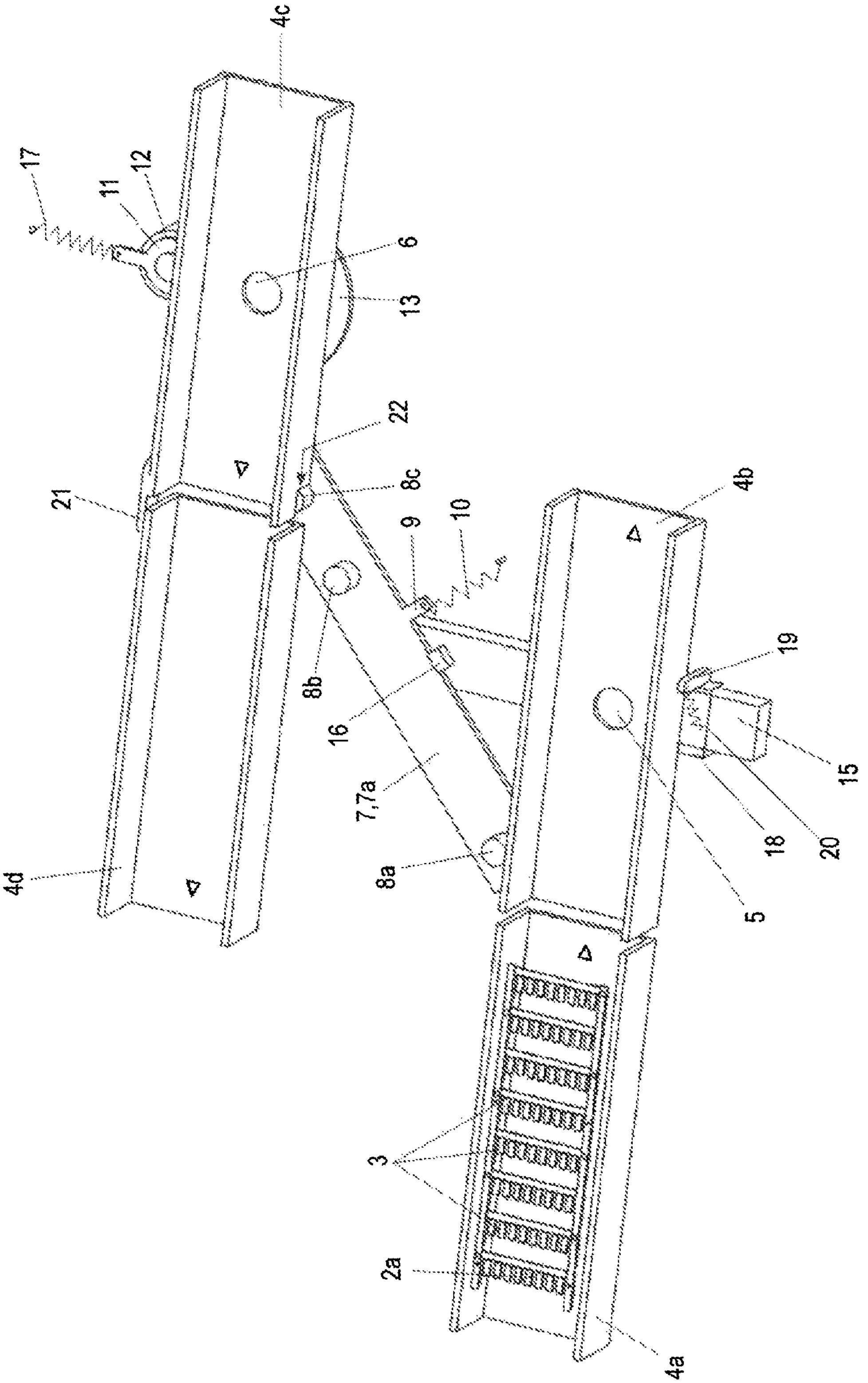
FIG. 3 is a perspective view of the apparatus from FIG. 1 with the first marker card to be printed, separated from a cartridge or stack, being situated in a receiving station on a cartridge.

The apparatus 1 is depicted in a perspective view in FIG. 3. The stops 8*a*, 8*b*, 8*c* on the stop section 7*a* of the pivot plate 7 are clearly shown as are webs 9 and 19 and the stop 22 and the recess 22.

Figure 4:
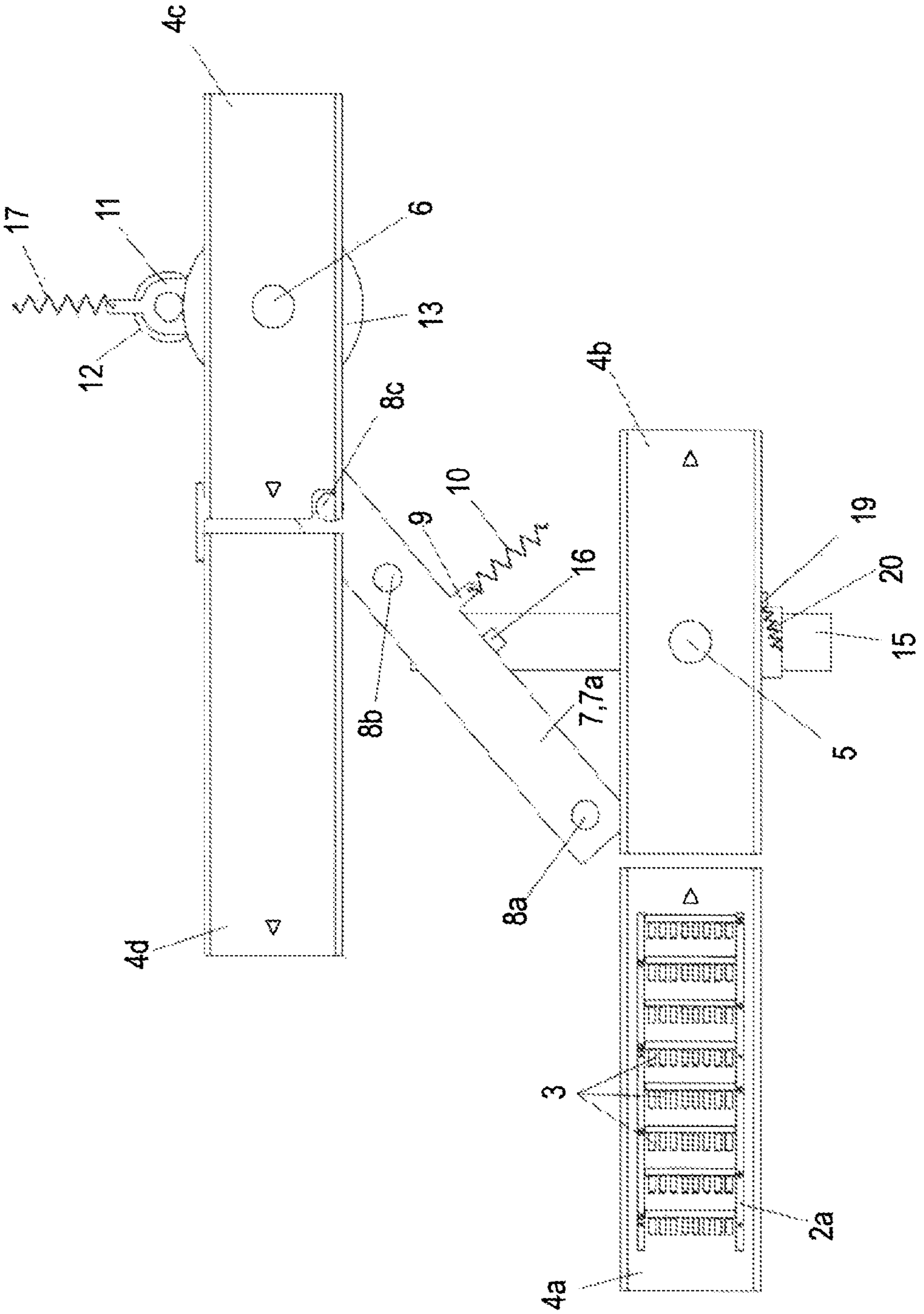
FIG. 4 is a plan view of the apparatus from FIG. 1, with the marker card to be printed being situated in a receiving station on the cartridge.

The depiction in FIG. 3 shows that a first marker card 2*a* has been separated from a cartridge into the first station 4*a* of the apparatus 1 with the separation apparatus. The marker card 2 lies in a flat-horizontal orientation in the first station 4*a*. The same situation is also depicted in FIG. 4.

Figure 5:
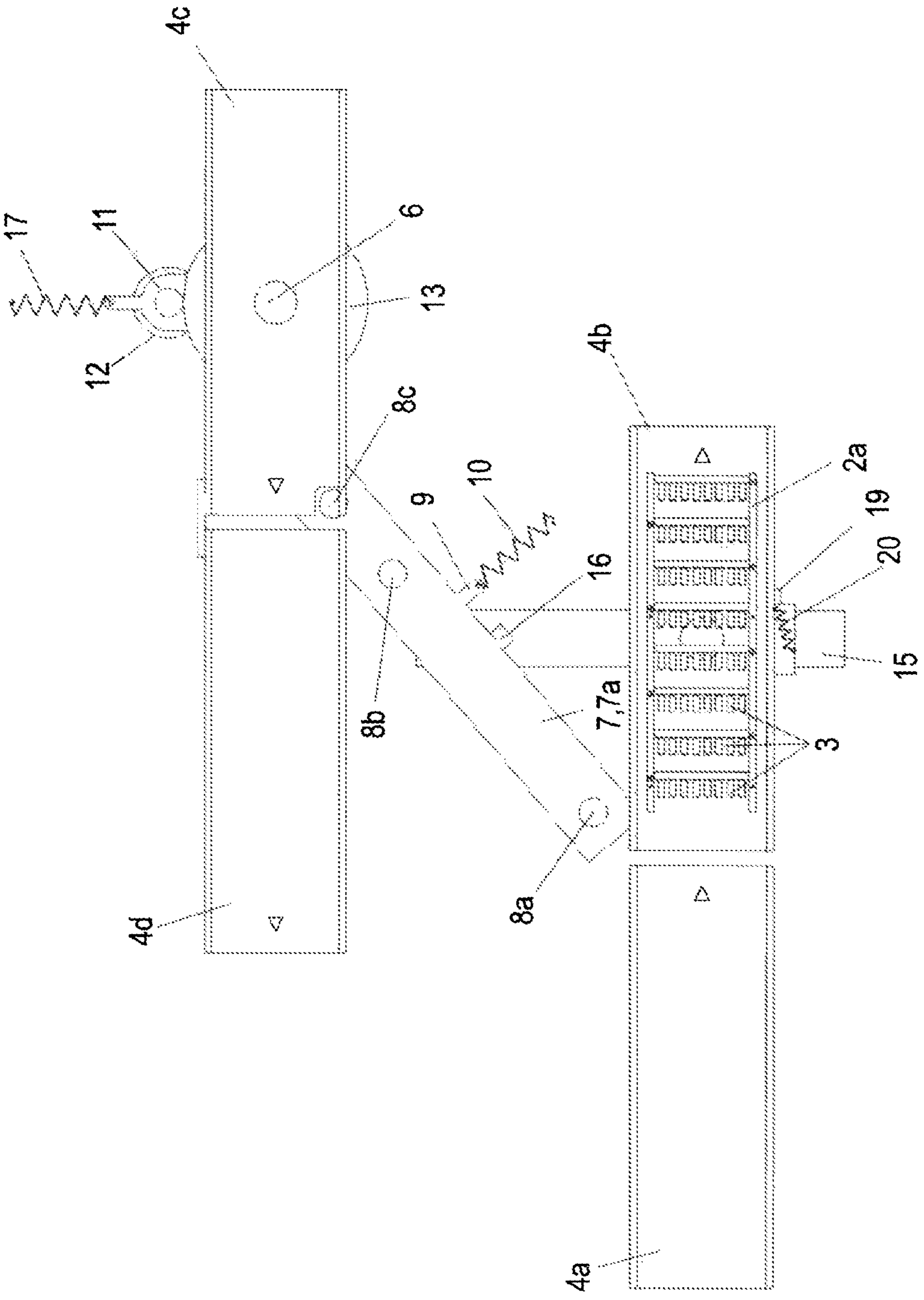

In FIG. 5, the first marker card 2*a* has been conveyed by the respective conveying device 23 of the first station 4*a* and the second station 4*b* centrally and symmetrically to the second station 2*b* and thus delivered to the printing region of the printer (not shown), so that the first marker card 2*a* can be printed.

Figure 6:
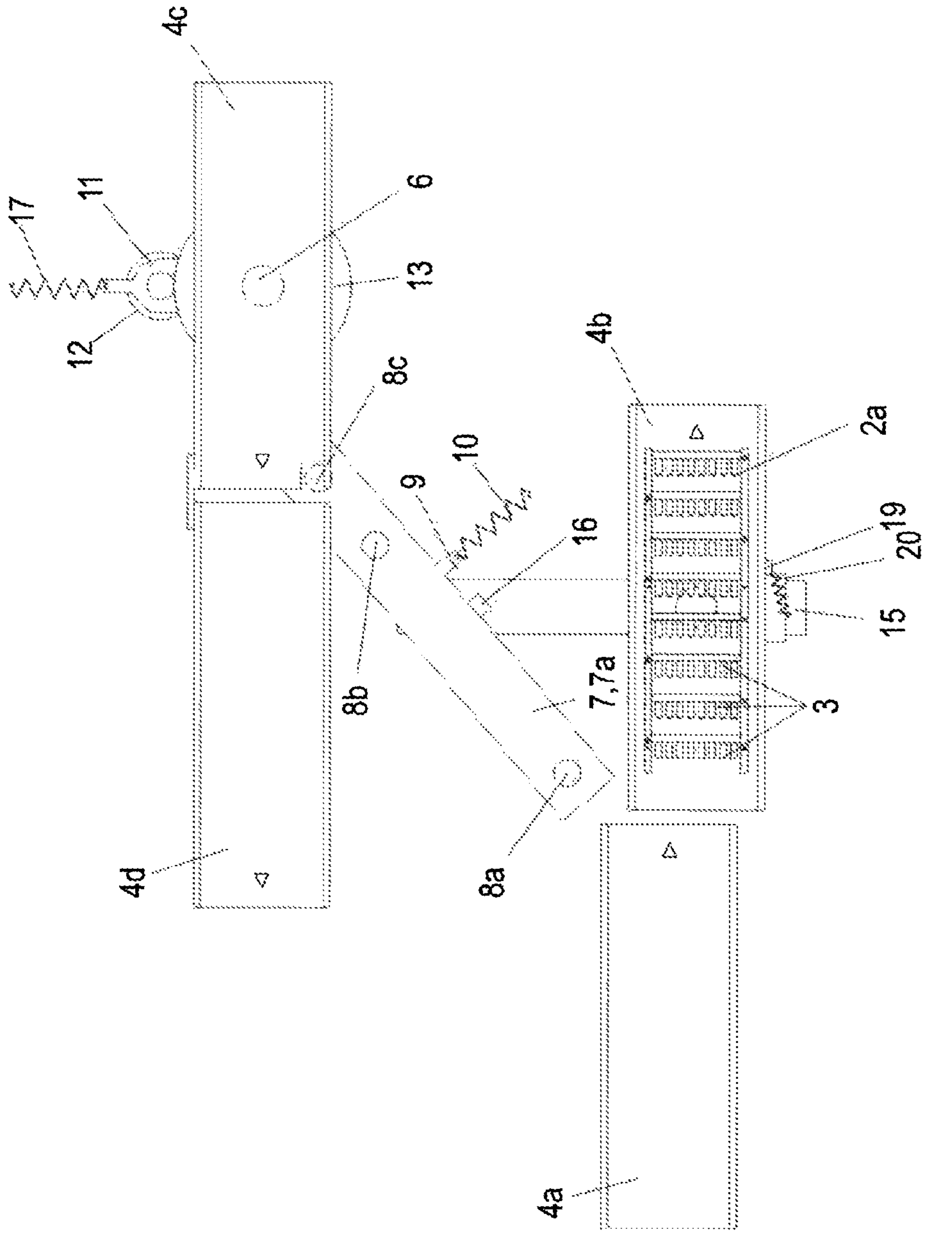
FIG. 6 is a plan view of the apparatus from FIG. 1, wherein the marker card or the like is being printed.

In FIG. 6, the first marker card 2*a* is situated in the printing position and is being printed. For this purpose, it may be necessary to move the second station 4*b* stepwise vertically downwards in relation to the drawing plane in FIG. 6 along the guide strip 15 and the guide carriage 18 if the printing width is less than the width of the first marker card 2*a*.

Figure 7:
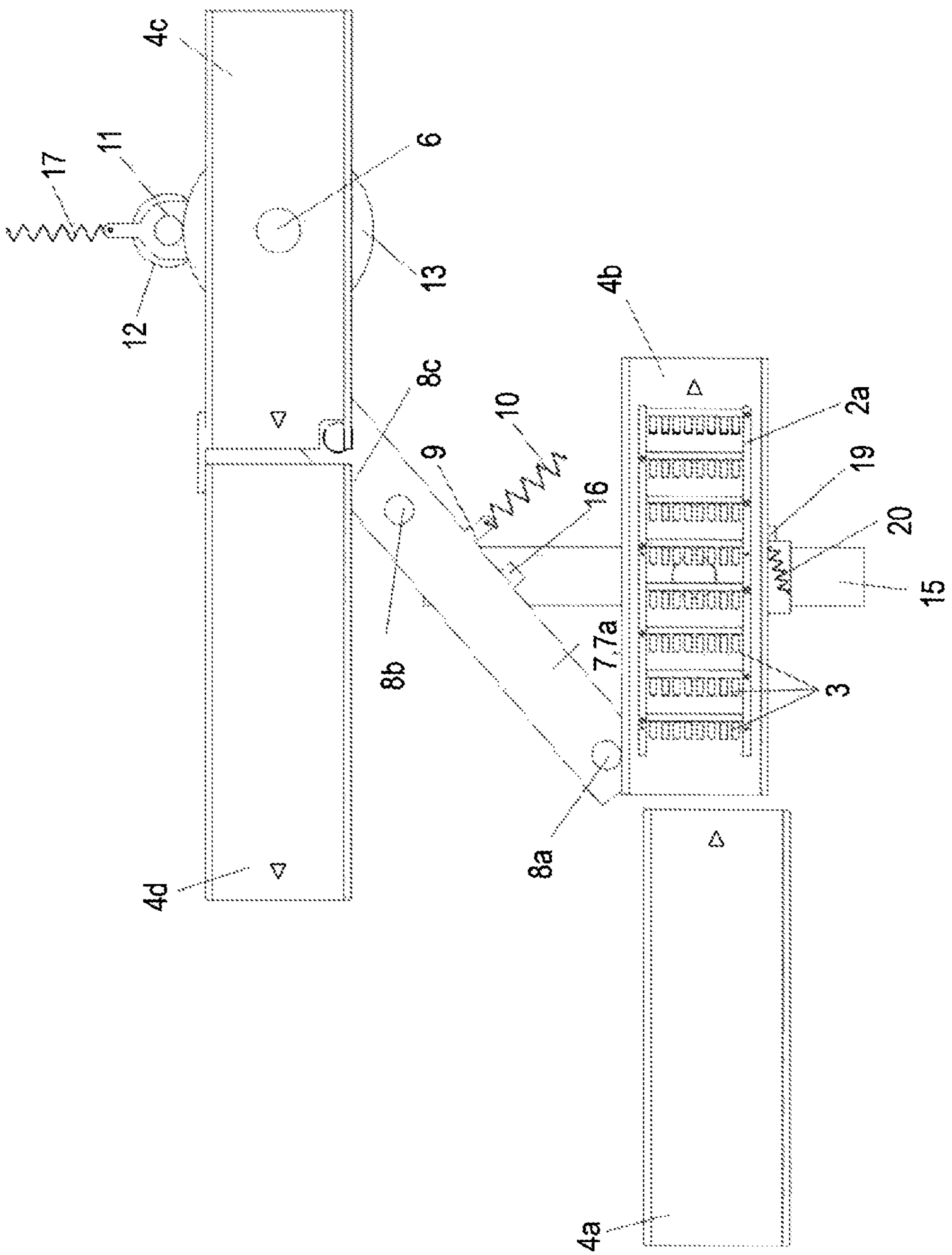
FIG. 7 is a plan view of the apparatus from FIG. 1, wherein the marker card or the like is printed.

In FIG. 7, the printing operation is completed and the second station 4*b* with the first printed marker card 2*a* is moved with the guide carriage 18 along the guide strip 15 vertically upwards in the direction of the pivot plate 7 in relation to the drawing plane in FIG. 7 until the second station 4*b* contacts the first stop 8*a* of the pivot plate 7.

Figure 8:
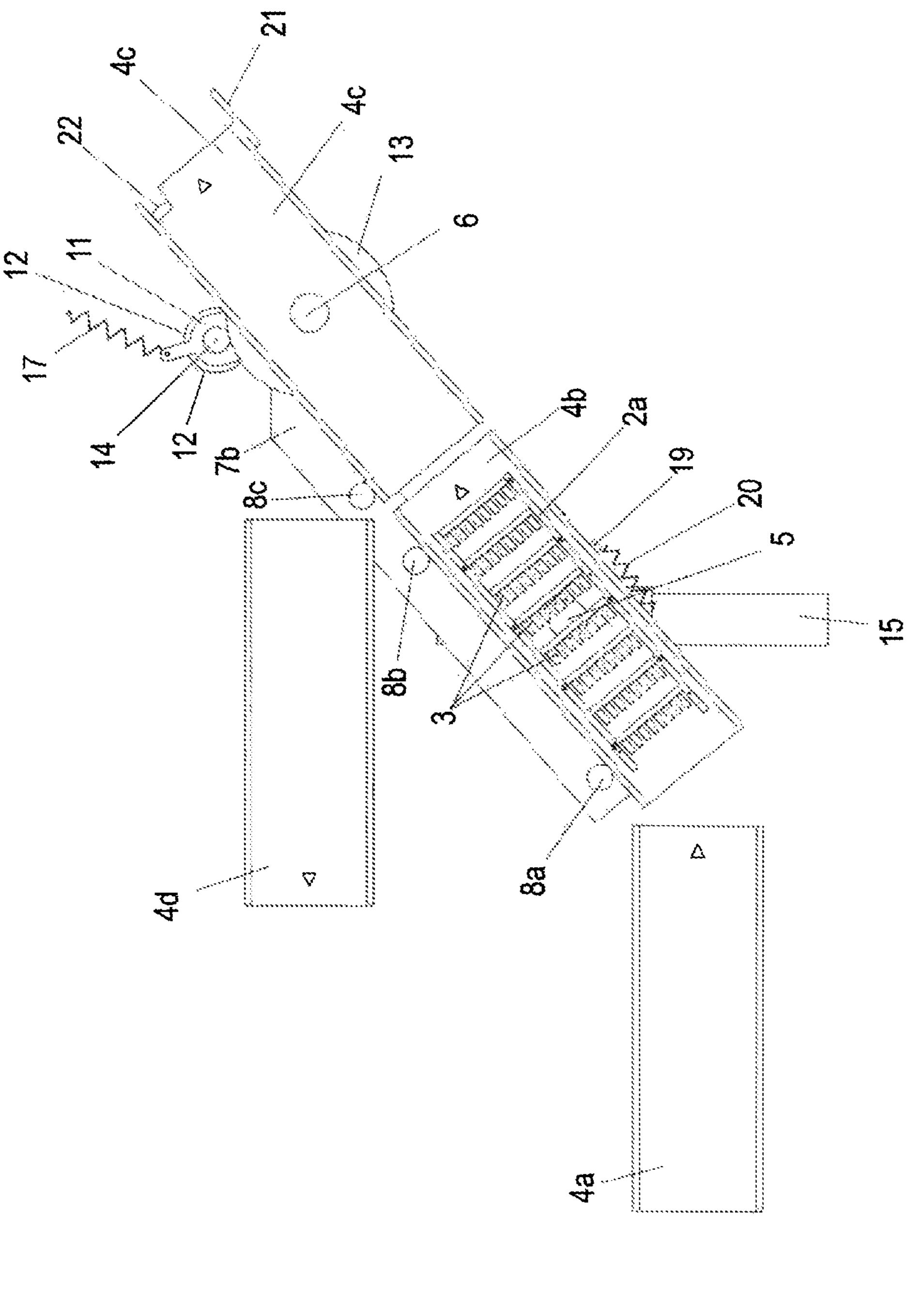
FIG. 8 a plan view of the apparatus from FIG. 1, wherein the marker card is being removed from the printing region into a transfer station.

In FIG. 8, the second station 4*b* is moved with the guide carriage 18 along the guide strip 15 further vertically upwards in the direction of the pivot plate 7, in relation to the drawing plane in FIG. 8 such that the second station 4*b* also contacts the second stop 8*b* of the pivot plate 7.

In this case, the station 4*b* performs a counter-clockwise pivot movement about a central axis of the first pivot bearing 5 since as a result of the direction of movement of the guide carriage 18 and of the first stop 8*a*, a force couple is formed which produces a torque which rotates around an instantaneous pole which coincides with a periphery of the first stop 8*a* and acts upon the second station 4*b*.

Both movements—namely the vertical movement of the station 4*b* along the guide strip 15 and the pivot movement of the station 4*b* about the central axis of the first pivot bearing 5 counter-clockwise—can be actuated in this case by a single second drive.

With regard to the pivot movement, since the second station 4*b*, by way of the third spring 20, and also the pivot plate 7, by way of the first spring 10, each have a resilient end stop, after the pivot movement of the second station 4*b* has taken place, from then onwards both the second station 4*b* and the pivot plate 7 are necessarily aligned parallel to one another, even when the second station 4*b* is displaced further vertically upwards along the guide strip 15, in order to compensate for potential tolerances between the components.

The third station 4*c*, driven by the motor 12, also performs a pivot movement via the pinion 14 and the gearwheel 13. A counter-torque in relation to the torque of the motor 12 is applied by the second spring 17. In this case, a clockwise pivot movement about a central axis of the second pivot bearing 6 is performed until the third station 4*c* contacts the third stop 8*c*.

Since the stops 8*a*, 8*b*, 8*c* are arranged in a line and the pivot plate can only move about the central axis of the second pivot bearing 6, which is also the pivot axis of the station 4*c*, the first station 4*b* and the second station 4*c* are aligned with one another after the respective stops 8*a*, 8*b* and 8*c*, respectively, have been reached. Any tolerances present are compensated by the drives continuing a little, after the stops of the stations have been reached. As a result, both drives continue (while both stations lie in the stops) into the corresponding springs and stop “gently” although the stations have undergone a stop.

If the pivot movement of the third station 4*c* comes to a standstill at the third stop pin 8*c*, the motor 12 remains switched on for a certain additional period of time and in the process deflects the second spring 17 out, since the third station 4*c* cannot be pivoted any further. Since the motor 12 is configured in such a way that its holding torque in the de-energised state is greater than the counter-torque that is applied by the second spring 17, the station 4*c* contacts the third stop 4*c* in a spring-loaded manner. The motor 12 can also be a motor with an active holding torque, such as a stepper motor for example.

As a result of the spring-loaded second station 4*b* and third station 4*c* during the respective pivot movement and during contacting of the stops 8*a* and 8*b* or 8*c* in the respective pivoted-out position of the respective station 4*b* or 4*c*, the pivot-and-stop system of the two stations 4*b* and 4*c* compensates tolerance with respect to mechanical and control-related influences.

As a result, the two stations 4*b* and 4*c* come to rest precisely at the stops 8*a* and 8*b* or 8*c*, although the drives stop gently in each case.

Figure 9:
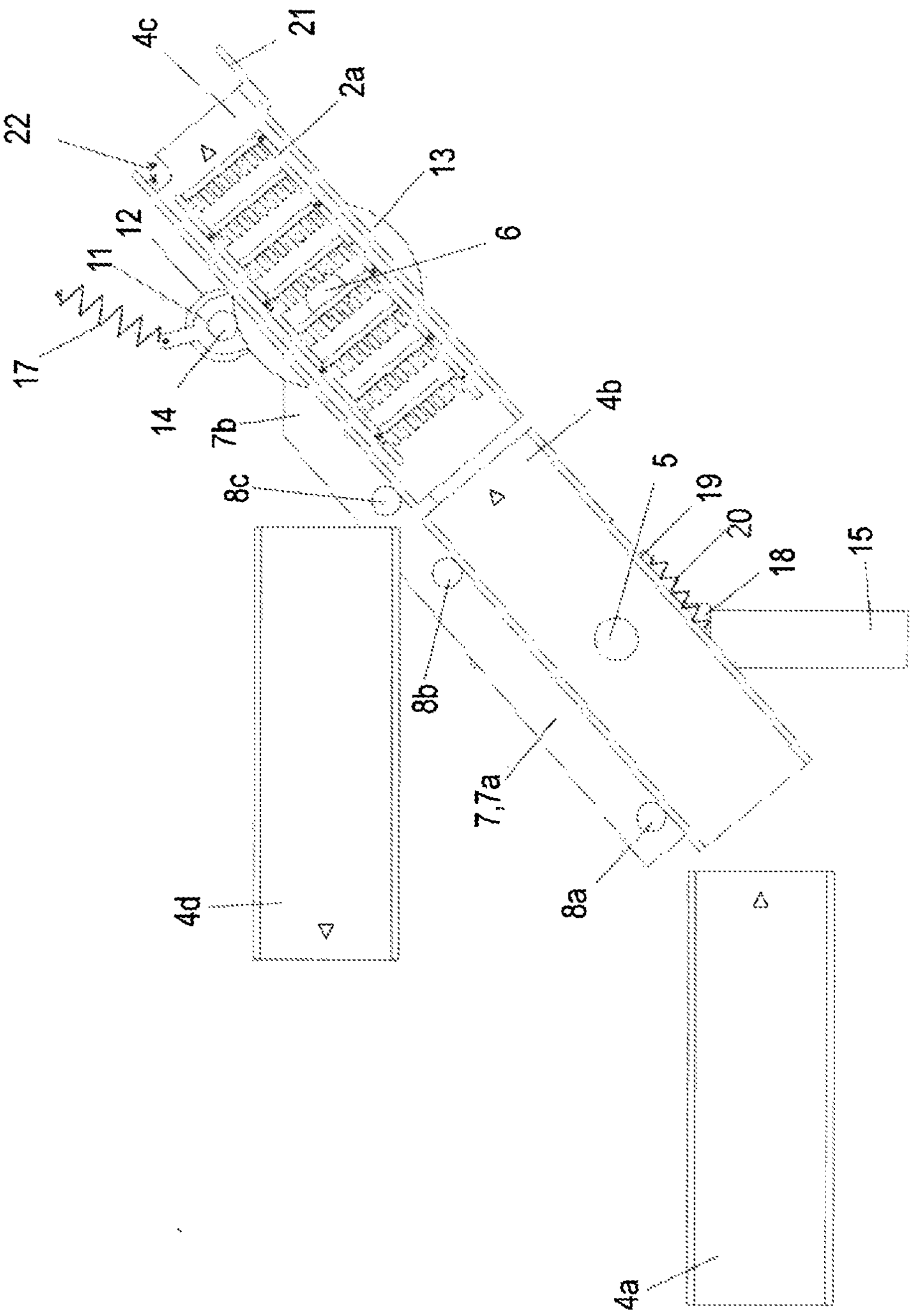
FIG. 9 is a plan view of the apparatus from FIG. 1, wherein the marker card or the like is being printed.

The depiction in FIG. 9 shows that the first marker card 2*a* has been transferred from the second station 4*b* to the third station 4*c*, which is aligned therewith, by the conveying device 23 shown in FIG. 13.

Figure 10:
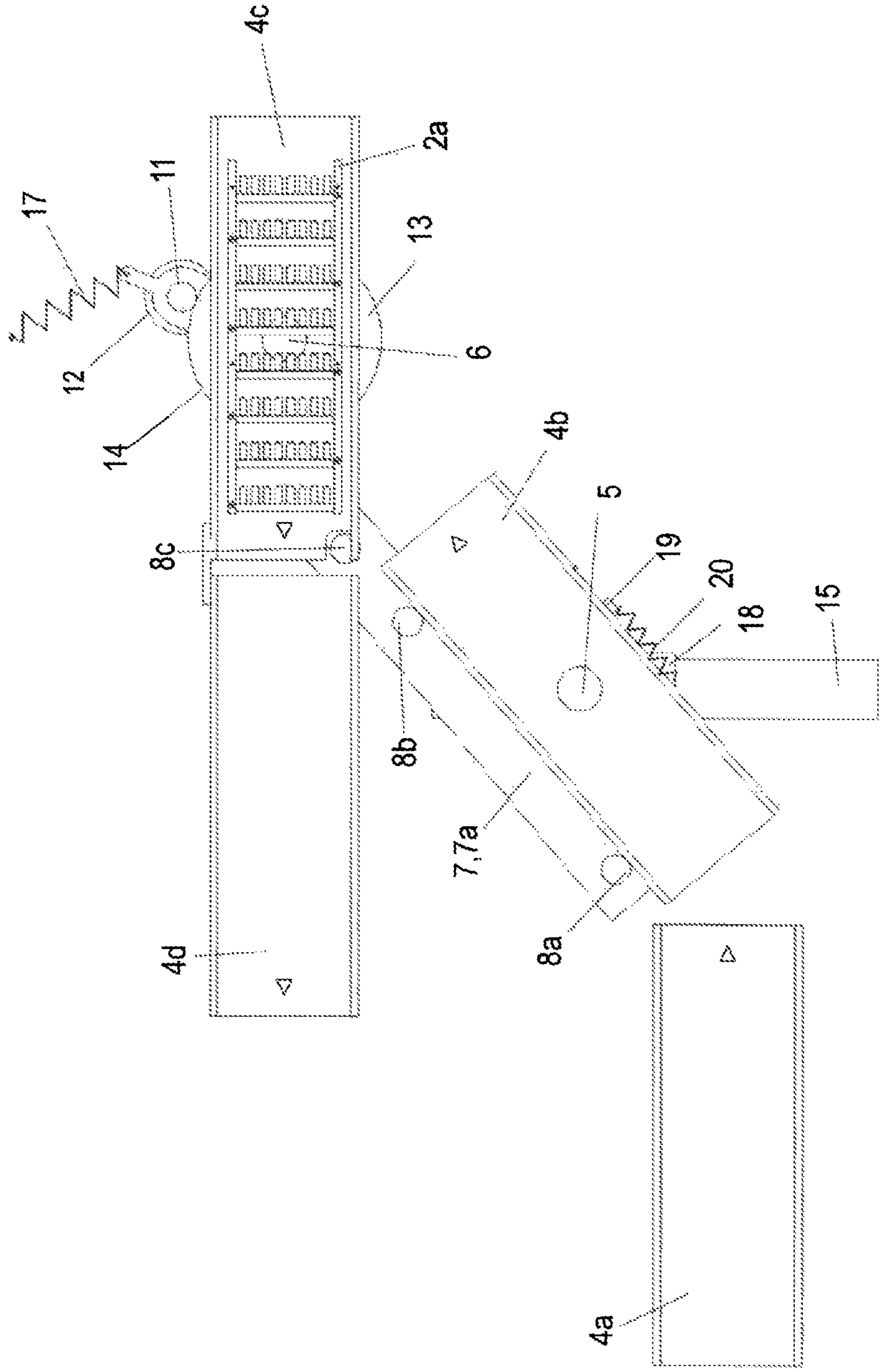
FIG. 10 is a plan view of the apparatus from FIG. 1, wherein the marker card in the transfer station is ready to be conveyed in a direction other than the conveying direction out of the receiving station on the cartridge to the printing region.

In FIG. 10, the situation is depicted in which the third station 4*c* has been pivoted back again into its initial position—therefore aligned or in a line with the fourth station 4*d*. For this purpose, the motor 12 has been placed into a reversing direction until the third station 4*c* has again contacted the stop 21.

Figure 11:
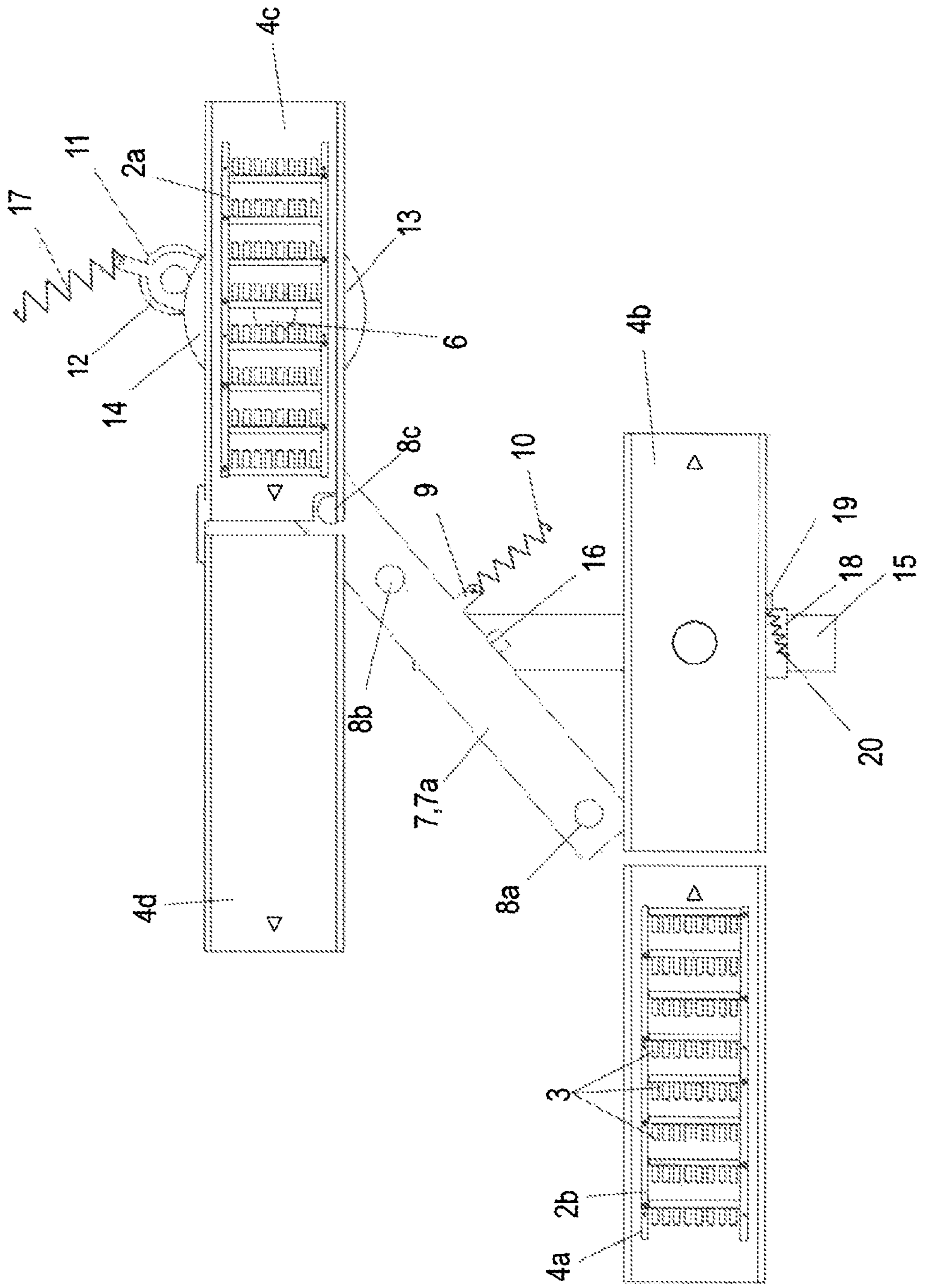
FIG. 11 is a plan view of the apparatus from FIG. 1, wherein the first marker card is situated in the transfer station and a further marker card has been separated and is situated in the receiving station on the cartridge.

The first marker card 2*a* can now be conveyed further into the fixing region or into the fourth station 4*d*, while a second marker card 2*b* has already been separated into the first station 4*a* as can be seen in FIG. 11.

Figure 12:
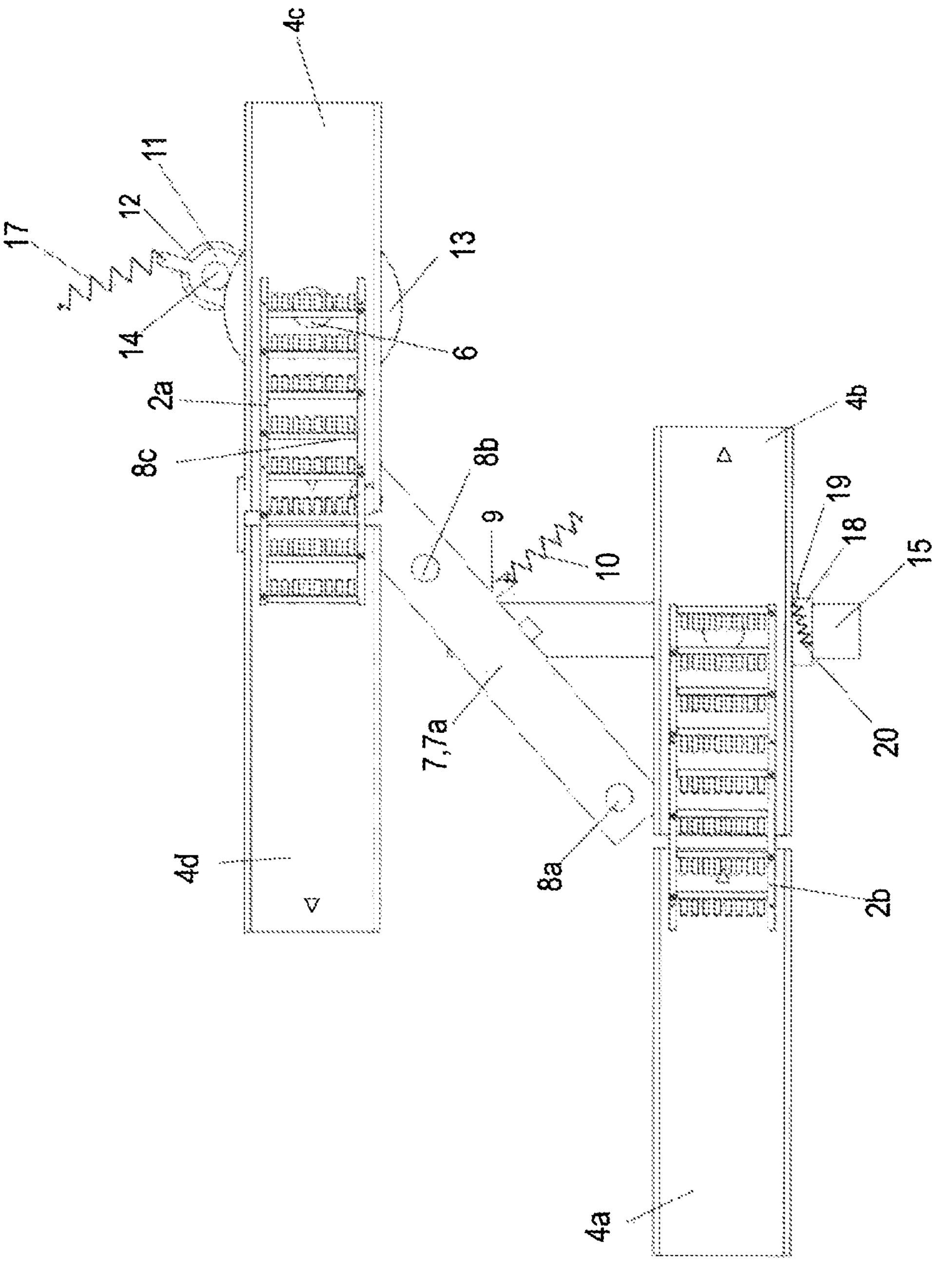
FIG. 12 is a plan view of the apparatus from FIG. 1, wherein the first marker card is being conveyed in a direction opposite to the conveying direction out of the cartridge to the printing region into the fixing unit and subsequently a removal position and the further marker card is being conveyed out of the receiving station on the cartridge into the printing region.

The depiction in FIG. 12 shows how after the first marker card 2*a* has been transferred to the third station 4*c* and has been pivoted with the third station 4*c*, the first marker card 2*a* is conveyed into the fourth station 4*d*, the output station, and the second marker card 2*b* is simultaneously conveyed out of the first station 4*a* into the second station 4*b* and therefore into the printing position.

As a result of the synthesis of the two operations, higher printing performance of the overall printing process of the printer is produced.

The invention claimed is:

1. A printer for printing marker cards with markers for marking electrical appliances, comprising a handling apparatus including a conveyor assembly which transfers the marker cards between a plurality of functional devices, said handling apparatus including a plurality of receiving and holding stations for the marker cards during printing, at least one of said receiving and holding stations being pivotable between first and second pivot positions against a corresponding resilient stop.

2. The printer as defined in claim 1, wherein said handling apparatus includes at least a first station, a second station and a third station.

3. The printer as defined in claim 2, wherein said second and third stations are in alignment in said first pivot position and are not in alignment in another pivot position.

4. The printer as defined in claim 2, wherein each station includes a conveyor which conveys each marker card within the station and from station to station.

5. The printer as defined in claim 4, wherein each station conveyor comprises one of a conveyor belt, a belt conveyor, and a roller conveyor.

6. The printer as defined in claim 1, wherein each station is configured as a shell having a U-shaped cross-section.

7. The printer as defined in claim 1, wherein a path of said conveyor assembly which transfers the marker cards is other than a straight line and includes at least one change of direction.

8. The printer as defined in claim 7, wherein when said conveyor path includes one change of direction, said conveyor path has an L-shape and when said conveyor path includes two changes of direction, said conveyor path has a U-shape.

9. The printer as defined in claim 8, wherein said conveyor path is contained two planes, a second plane being vertically offset from said first plane by less than 20 mm.

10. The printer as defined in claim 7, wherein said conveyor path includes more than two changes of direction.

11. The printer as defined in claim 7, wherein said conveyor path is contained in a single plane.

12. The printer as defined in claim 2, wherein said handling apparatus includes a pivot plate positioned between said second and third stations.

13. The printer as defined in claim 12, wherein said pivot plate includes a stop portion which extends at an angle between the stations which are oriented in parallel in a first pivot position.

14. The printer as defined in claim 13 wherein said stop portion includes at least one stop which extends from said pivot plate.

15. The printer as defined in claim 14, wherein said at least one stop is resilient.

16. The printer as defined in claim 13, wherein said pivot plate further includes at least one bearing portion.

17. The printer as defined in claim 13, wherein said stop portion includes a web containing a borehole which is engaged by a grommet of a first spring.

18. The printer as defined in claim 16, wherein said bearing portion receives a stationary bearing pin of a second pivot bearing of said third station and includes a retention plate coaxial with said second pivot bearing, said retention plate being mounted in a rotatable manner coaxial with said second pivot bearing.

19. The printer as defined in claim 18, wherein said handling apparatus further comprises a first drive motor attached to said retention plate in a non-rotatable manner.

20. The printer as defined in claim 19, wherein said first drive motor is configured to initiate pivotal movement of the third station via a gear mechanism.

21. The printer as defined in claim 20, wherein said retention plate includes a second spring which serves as a restoring spring for said first drive motor.

22. The printer as defined in claim 20, wherein said first drive motor drives a pinion which meshes with a gearwheel connected with said third station in a non-rotatable manner.

23. The printer as defined in claim 22, wherein said third station driven by said first drive motor performs a pivot movement via said pinion and said gearwheel, wherein a counter-torque relative to a torque of said first drive motor is applied by said second spring produces a clockwise pivot movement about a central axis of said second pivot bearing until said third station contacts a third stop.

24. The printer as defined in claim 23, wherein said second station and said third station are aligned with one another in a repeatable manner after the respective stops have been reached.

25. The printer as defined in claim 23, wherein said first drive motor provides a first drive of said second and third stations to engage respective stops and a second drive which continuing further into corresponding springs and stopping as a result.

26. The printer as defined in claim 25, wherein said first drive motor remains switched on for a certain additional period of time after pivot movement of said third station is interrupted at a third stop and said second spring is deflected, said third station contacting said third stop in a spring-loaded manner.

27. The printer as defined in claim 26, wherein said spring-loaded second and third stations during respective pivot movement and contacting of respective stops in a respective pivot-out position compensates tolerances with respect to mechanical and control-related influences.

28. The printer as defined in claim 12, wherein said handling apparatus further comprises a guide strip on which a guide carriage is guided in a movable manner, said guide carriage having a stationary bearing pin of a first pivot bearing for mounting said second station in a pivotable manner on said guide carriage.

29. The printer as defined in claim 28, wherein said second station includes a web containing a borehole engaged by a grommet of a third spring.

30. The printer as defined in claim 29, wherein said third spring is connected with said guide carriage.

31. The printer as defined in claim 30, wherein a vertical movement of said second station along said guide strip and a pivot movement of said second station counter-clockwise about a central axis of said first pivot hearing are actuated by a single second drive.

32. The printer as defined in claim 31, wherein said second station and said pivot plate each have a resilient end stop, whereby after a pivot movement of said second station, said second station and said pivot plate are aligned parallel to one another, including when said second station is displaced vertically upwards along said guide strip.

33. The printer as defined in claim 1, wherein said functional devices include at least one of a separation device, a printing device, and a fixing device.

34. The printer as defined in claim 1, wherein said handling apparatus includes at least one cooling area for cooling the marker cards following printing.

35. A method for conveying, a plate-shaped medium on a conveying path through a printer as defined in claim 1, wherein a conveying path of a respective plate-like medium includes at least one change of direction which deviates from a straight line, and further wherein at least one of said stations is configured in a pivotable manner and during operation is pivoted out of a first pivot position into a second pivot position against a resilient stop.

36. A printer for printing marker cards with markers for marking electrical appliances, comprising a handling apparatus including (a) a conveyor assembly which transfers the marker cards between a plurality of functional devices and which includes a path arranged in a single plane and having at least one change of direction; and (b) a plurality of receiving and holding stations for the marker cards during printing, at least one of said receiving and holding stations being pivotable between first and second pivot positions against a corresponding resilient stop.

* * * * *